United States Patent
Kim et al.

(10) Patent No.: US 12,294,136 B2
(45) Date of Patent: May 6, 2025

(54) CLAMPING APPARATUS FOR ANTENNA

(71) Applicant: KMW INC., Hwaseong-si (KR)

(72) Inventors: In Ho Kim, Yongin-si (KR); Seong Man Kang, Hwaseong-si (KR); Yong Hee Han, Osan-si (KR); Hyoung Seok Yang, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 417 days.

(21) Appl. No.: 17/576,917

(22) Filed: Jan. 15, 2022

(65) Prior Publication Data
US 2022/0140466 A1    May 5, 2022

Related U.S. Application Data
(63) Continuation of application No. PCT/KR2020/008893, filed on Jul. 8, 2020.

(30) Foreign Application Priority Data

Jul. 18, 2019    (KR) .................. 10-2019-0086928
Dec. 11, 2019    (KR) .................. 10-2019-0164286

(51) Int. Cl.
*H01Q 1/12*    (2006.01)
*H01Q 1/20*    (2006.01)
(Continued)

(52) U.S. Cl.
CPC ......... *H01Q 1/1228* (2013.01); *H01Q 1/1242* (2013.01); *H01Q 1/20* (2013.01); *H01Q 1/428* (2013.01); *H01Q 3/02* (2013.01)

(58) Field of Classification Search
CPC ...... H01Q 1/1228; H01Q 1/1242; H01Q 1/20; H01Q 1/428; H01Q 3/02; H01Q 1/088;
(Continued)

(56) References Cited

U.S. PATENT DOCUMENTS

| 5,416,295 | A | | 5/1995 | White et al. |
| 6,037,913 | A | * | 3/2000 | Johnson .............. H01Q 1/1221 343/890 |

(Continued)

FOREIGN PATENT DOCUMENTS

| CN | 1337075 A | 2/2002 |
| CN | 107210526 A | 9/2017 |

(Continued)

OTHER PUBLICATIONS

Non-final office action mailed Aug. 22, 2023 from the Japanese Intellectual Property Office for Japanese Application No. 2022-502393.

(Continued)

*Primary Examiner* — Muhammad Ijaz
(74) *Attorney, Agent, or Firm* — Insight Law Group, PLLC; Seung Lee

(57) ABSTRACT

A clamping apparatus for an antenna includes: an arm unit coupled to a support pole and extending in one horizontal direction from the support pole by a predetermined distance; a common coupling unit detachably mounted to a front end of the arm unit by insertion and detachment operations of a coupling shaft elongated vertically, the common coupling unit being selectively rotatable from side to side about the coupling shaft; a rotation unit having a front end detachably mounted to a front end of the coupling unit by insertion and detachment operations of a rotary shaft elongated vertically, the rotation unit being rotatable from side to side by a predetermined angle about the rotary shaft; and a tilting unit coupled to the front end of the rotation unit to be tiltable vertically, an antenna device being coupled to the tilting unit.

16 Claims, 16 Drawing Sheets

(51) Int. Cl.
*H01Q 1/42* (2006.01)
*H01Q 3/02* (2006.01)

(58) Field of Classification Search
CPC ........ H01Q 1/125; H01Q 3/08; H01Q 1/1207;
F16B 2/12; F16B 7/0486; F16B 9/054;
F16B 2/02; F16H 57/039
USPC .......................................................... 248/689
See application file for complete search history.

(56) References Cited

U.S. PATENT DOCUMENTS

| | | | |
|---|---|---|---|
| 6,452,567 B1 * | 9/2002 | Overton | H01Q 1/12 |
| | | | 343/882 |
| 6,538,613 B1 | 3/2003 | Pursiheimo | |
| 10,276,933 B1 | 4/2019 | Chukka et al. | |
| 10,742,270 B1 * | 8/2020 | Kim | H04B 7/0456 |
| 11,923,615 B2 * | 3/2024 | Kim | H01Q 1/125 |
| 2002/0105478 A1 | 8/2002 | Overton | |
| 2002/0196195 A1 * | 12/2002 | Vermette | H01Q 1/125 |
| | | | 343/882 |
| 2015/0280307 A1 * | 10/2015 | Lin | H01Q 1/1264 |
| | | | 248/230.5 |
| 2018/0094768 A1 * | 4/2018 | Burke | F16M 11/18 |
| 2022/0123455 A1 * | 4/2022 | Kang | H01Q 1/1264 |
| 2022/0140466 A1 * | 5/2022 | Kim | H01Q 1/1228 |
| | | | 343/702 |
| 2022/0384946 A1 * | 12/2022 | Kim | H01Q 1/1264 |
| 2024/0047849 A1 * | 2/2024 | Kim | H01Q 1/1264 |

FOREIGN PATENT DOCUMENTS

| | | |
|---|---|---|
| JP | H04-268474 A | 9/1992 |
| JP | H07-307606 A | 11/1995 |
| JP | H11-88018 A | 3/1999 |
| JP | 2002-009517 A | 1/2002 |
| JP | 2006-82141 A | 3/2006 |
| JP | 2014-145707 A | 8/2014 |
| JP | 2019-080224 A | 5/2019 |
| KR | 10-2001-0017379 A | 3/2001 |
| KR | 10-2005-0017245 A | 2/2005 |
| KR | 10-0563565 B1 | 3/2006 |
| KR | 20-0421716 Y1 | 7/2006 |
| KR | 10-0888259 B1 | 3/2009 |
| KR | 20-2010-0001808 U | 2/2010 |
| KR | 20-2011-0001413 U | 2/2011 |
| KR | 20-2013-0001644 U | 3/2013 |
| KR | 10-2013-0055141 A | 5/2013 |
| WO | 2019/110697 A | 6/2019 |

OTHER PUBLICATIONS

Extended European Search Report mailed Oct. 18, 2023 from the European Patent Office for European Application No. 20840662.9.
Non-final office action mailed Feb. 7, 2023 from the Japanese Intellectual Property Office for Japanese Application No. 2022-502393.
Non-final office action mailed May 19, 2022 from the Indian Intellectual Property Office for Indian Application No. 202217003607.
International Search Report mailed Oct. 20, 2020 for International Application No. PCT/KR2020/008893 and its English translation.
Notice of Allowance mailed Mar. 15, 2021 for Korean Application No. 10-2019-0164286.
Non-final office action mailed May 25, 2024 from the Chinese Patent Office for Chinese Application No. 202080052110.6.

* cited by examiner (a)

(b)

(c)

CLAMPING APPARATUS FOR ANTENNA

CROSS-REFERENCE TO RELATED APPLICATIONS

This application is a Continuation of International Application No. PCT/KR2020/008893, filed on Jul. 8, 2020, which claims the benefit of and priority to Korean Patent Application Nos. 10-2019-0086928, filed on Jul. 18, 2019; and 10-2019-0164286, filed on Dec. 11, 2019, the disclosure of which are herein incorporated by reference in their entirety.

TECHNICAL FIELD

The present disclosure relates to a clamping apparatus for an antenna, and more particularly, to a clamping apparatus for an antenna, which is capable of easily adjusting the direction of each antenna device, while efficiently arranging a plurality of antenna devices in a dense space.

BACKGROUND ART

Wireless communication technology such as Multiple-input multiple-output (MIMO) is a technology that dramatically increases data transmission capacity by means of multiple antennas and that employs a spatial multiplexing scheme in which transmitters transmit different types of data through individual transmit antennas and receivers separate the transmitted data through appropriate processing of signals.

Accordingly, as the number of transmit/receive antennas is increased simultaneously, it is possible to transmit a larger amount of data through an increase in channel capacity. For example, if 10 antennas are used, a channel capacity of approximately 10 times is achieved in the same frequency band, compared to a current single antenna system.

A 4G LTE-advanced network uses up to 8 antennas, and products equipped with 64 or 128 antennas are currently being developed for a pre-5G network. A 5G network expects to use base station equipment with a much larger number of antennas, which is called Massive MIMO. Although cell operation is currently implemented in a 2-dimensional manner, 3D-beamforming becomes possible by introduction of Massive MIMO, which is also called full dimension MIMO (FD-MIMO).

In the Massive MIMO, as the number of antennas increases, the number of transmitters and filters increases as well. Nevertheless, due to the lease cost and space constraints of the installation site, RF components (antennas, filters, power amplifiers, transceivers, etc.) must be made small, light, and inexpensive, and Massive MIMO requires high power for coverage expansion. Such high power causes significant power consumption and heating value acting as negative factors in reducing the weight and size of components.

In particular, when a MIMO antenna, in which modules implemented with RF elements and digital elements are combined in a stacked structure is installed in a confined space, it is necessary to design a plurality of layers constituting the MIMO antenna to be compact and miniaturized in order to maximize ease of installation or space utilization. In addition, there is a strong need for free direction adjustment of an antenna device installed on one support pole.

DISCLOSURE

Technical Problem

An object of the present disclosure is to provide a clamping apparatus for an antenna, which is capable of increasing a degree of freedom of installation for a support pole having many space constraints while improving workability.

Another object of the present disclosure is to provide a clamping apparatus for an antenna, which is capable of simplifying an assembly process of various types of rotation or tilting units by standardizing or making a common use of a coupling structure to an end of an arm unit.

The present disclosure is not limited to the above-mentioned objects, and other objects of the present disclosure can be clearly understood by those skilled in the art to which the present disclosure pertains from the following description.

Technical Solution

In accordance with an aspect of the present disclosure, there is provided a clamping apparatus for an antenna, which includes an arm unit coupled to a support pole and extending in one horizontal direction from the support pole by a predetermined distance, a common coupling unit detachably mounted to a front end of the arm unit by insertion and detachment operations of a coupling shaft elongated vertically, the common coupling unit being selectively rotatable from side to side about the coupling shaft, a rotation unit having a front end detachably mounted to a front end of the coupling unit by insertion and detachment operations of a rotary shaft elongated vertically, the rotation unit being rotatable from side to side by a predetermined angle about the rotary shaft, and a tilting unit coupled to the front end of the rotation unit to be tiltable vertically, an antenna device being coupled to the tilting unit, wherein the front end of the arm unit is provided with a fixing shaft hole block to which the coupling shaft of the common coupling unit is axially coupled.

In accordance with another aspect of the present disclosure, there is provided a clamping apparatus for an antenna, which includes an arm unit coupled to a support pole and extending in one horizontal direction from the support pole by a predetermined distance, a rotation unit detachably mounted to a front end of the arm unit by insertion and detachment operations of a rotary shaft elongated vertically, the rotation unit being rotatable from side to side by a predetermined angle about the rotary shaft, and a tilting unit coupled to a front end of the rotation unit to be tiltable vertically, an antenna device being coupled to the tilting unit, wherein the front end of the arm unit is provided with a fixing shaft hole block to which the rotary shaft of the rotation unit is axially coupled.

The front end of the arm unit may be provided with an installation space in which the fixing shaft hole block is inserted and installed, and the fixing shaft hole block may be provided with a shaft insertion hole in which the coupling shaft of the common coupling unit or the rotary shaft of the rotation unit is axially installed from top to bottom.

The front end of the arm body may have a shaft through-hole through which the coupling shaft of the common coupling unit or the rotary shaft of the rotation unit is moved from top to bottom and is axially installed in the shaft insertion hole of the fixing shaft hole block.

The front end of the arm unit may be provided with a brake part configured to form a predetermined frictional force between the front end of the arm body and the common coupling unit or the rotation unit.

The brake part may include an upper brake washer pad provided on an upper side of the front end of the arm unit to form a frictional force with an upper bonding surface of the common coupling unit or the rotation unit, and a lower brake washer pad provided on a lower side of the front end of the arm unit to form a frictional force with a lower bonding surface of the common coupling unit or the rotation unit.

The lower brake washer pad may be installed through a washer installation bracket extending from a lower surface of a rear end of the rotation unit.

The brake part may include a fixing plate fixed to an upper or lower side of the front end of the arm unit to provide a friction surface, and a rotating plate provided to an upper or lower side of the common coupling unit or the rotation unit to form a frictional force with the fixing plate while rotating.

The common coupling unit may be provided with a rotation angle adjustment part configured to adjust an angle of left and right rotation of the rotation unit, and the rotation unit may be provided with a tilt angle adjustment part configured to adjust an angle of vertical tilt of the tilting unit.

The rotation angle adjustment part may include a worm wheel gear axially coupled to the coupling shaft of the common coupling unit for rotation, and having worm wheel gear teeth formed on an outer peripheral surface thereof, and a worm gear coupled orthogonally to the coupling shaft to rotate the worm wheel gear, and having worm gear teeth formed on an outer peripheral surface thereof and engaged with the worm wheel gear teeth.

The tilt angle adjustment part may include a worm wheel gear coupled to a tilt shaft of the tilting unit for rotation, and having worm wheel gear teeth formed on an outer peripheral surface thereof, and a worm gear coupled orthogonally to the tilt shaft to rotate the worm wheel gear, and having worm gear teeth formed on an outer peripheral surface thereof and engaged with the worm wheel gear teeth.

The clamping apparatus may include a rotation motor axially coupled to the worm gear to electrically rotate the worm gear.

The rotation unit may be provided with a tilt angle adjustment part configured to adjust an angle of vertical tilt of the tilting unit.

A bracket panel may be attached on a front surface of the tilting unit, a hook fastening bracket may be spaced rearward from a rear surface of the antenna device coupled to the tilting unit, and the antenna device may be coupled by inserting the hook fastening bracket into a fastening groove formed between the tilting unit and the bracket panel.

The tilting unit and the antenna device may be screwed by hook fixing screws fastened to the antenna device through both of the bracket panel and the hook fastening bracket together.

The tilting of the tilting unit and the rotation of the rotation unit may be controlled by a remote controller connected to enable electrical communication with the tilting unit and the rotation unit.

The tilting of the tilting unit and the rotation of the rotation unit may be remotely controlled by an operator and maintenance (O&M) unit through a distribute unit (DU) for a controller of the antenna device connected to enable electrical communication with the tilting unit and the rotation unit.

The arm unit may be in the form of a single beam connected to one support pole.

The arm unit may be branched such that at least one clamping section including the tilting unit and the rotation unit is connected to each end of the arm unit.

The arm unit may consist of two or three or more arm units connected radially to one support pole, each of the arm units being in the form of a single beam.

Advantageous Effects

A clamping apparatus for an antenna according to exemplary embodiments of present disclosure can achieve various effects as follows.

Firstly, it is possible to easily design spatial arrangement of a plurality of antenna devices installed on one support pole by manufacturing and installing an arm unit to have different lengths.

Secondly, since tilting and rotation units enable an antenna device to easy tilt and rotate, it is possible to improve workability and frequency yield performance of the antenna device.

LIST OF REFERENCE NUMERALS

Figure 1:
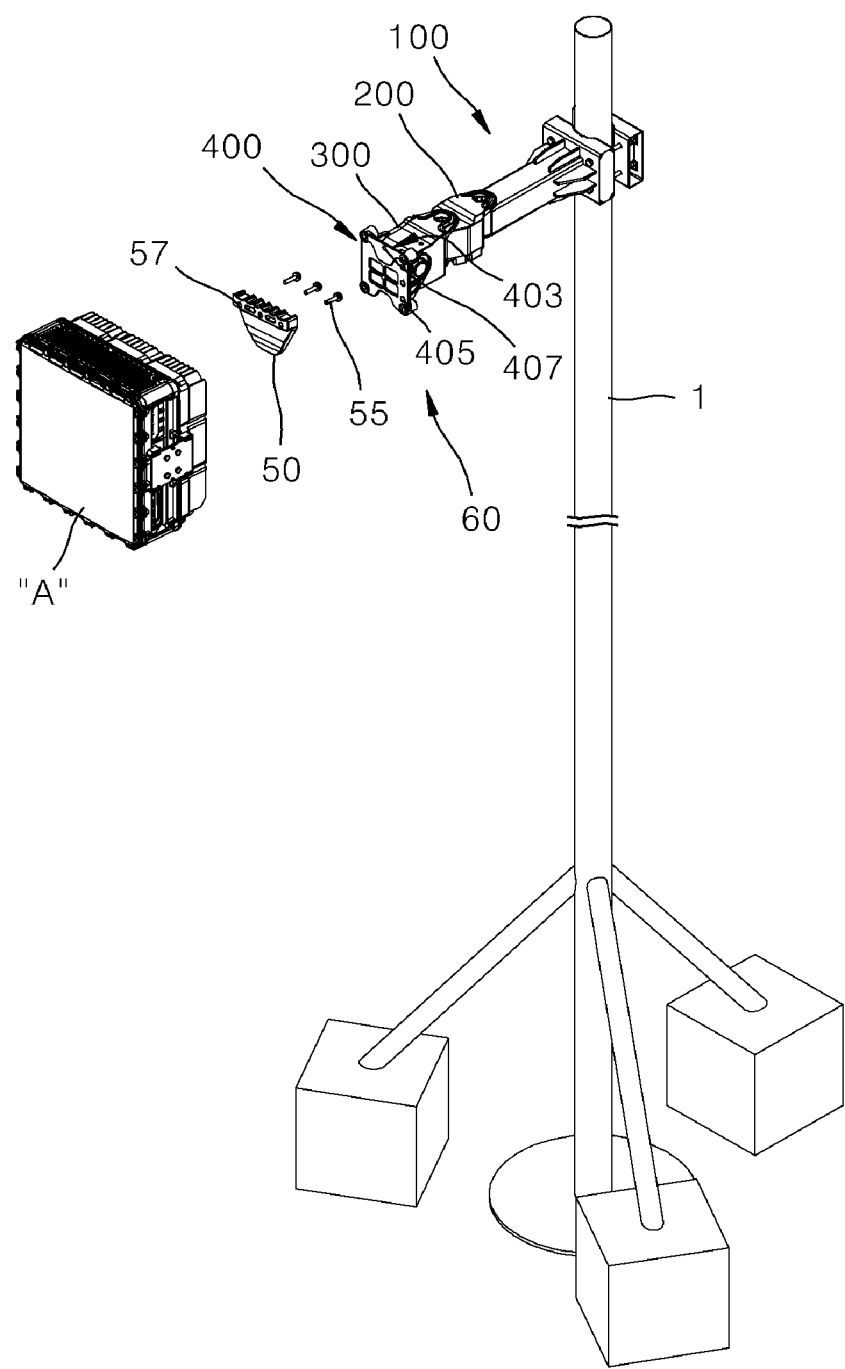
FIG. 1 is a perspective view illustrating a clamping apparatus for an antenna according to an embodiment of the present disclosure.

1: support pole 60: clamping section
100: arm unit 110: arm body
115: reinforcing rib 120: fixed bracket
130: detachable bracket 140: long fixing bolt
160: internal space 165: shaft through-hole
170A, 175a: upper brake washer pad 170a, 170b: fixing plate 170b, 175b: lower brake washer pad 175a, 175b: rotating plate
180: washer installation bracket 190: fixing shaft hole block
191: shaft insertion hole 150: fixing nut
200: common coupling unit 201: first common coupling part
202: second common coupling part 207: coupling unit cover
210: coupling shaft 220: coupling unit housing
230: rotation angle adjustment part 231: rotating shaft
231': shaft hole 232: worm wheel gear
233: worm gear 234: worm gear tooth
235: rotation motor 236: motor bracket
330: tilt angle adjustment part 331: tilting shaft
331': shaft hole 332: worm wheel gear
333: worm gear 334: worm gear teeth
400: tilting unit 401: first tilting coupling part
402: second tilting coupling part 403: fastening groove
405: bracket panel 407: tilting-side screw hole

BEST MODE

Hereinafter, a clamping apparatus for an antenna according to exemplary embodiments of the present disclosure will be described in detail with reference to the accompanying drawings. It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

The terms such as "first", "second", "A", "B", "(a)", and "(b)" may be used herein to describe components in the embodiments of the present disclosure. These terms are not used to define an essence, order or sequence of a corresponding component but used merely to distinguish the corresponding component from other component(s). Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
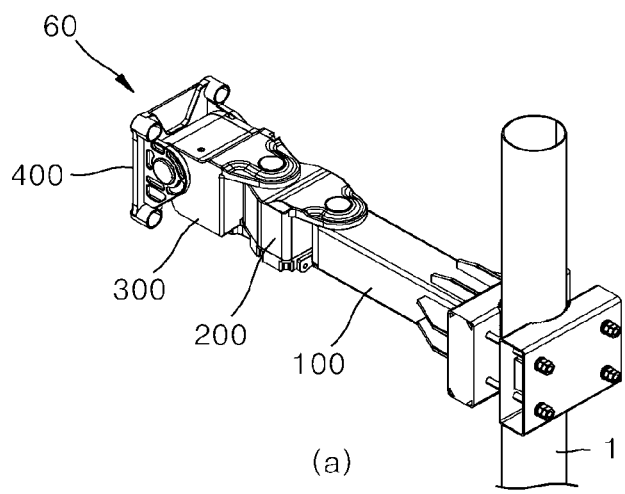
FIG. 2 is a perspective view illustrating various examples of installation of a support pole of the clamping apparatus for an antenna according to the embodiment of the present disclosure.
Figure 2:
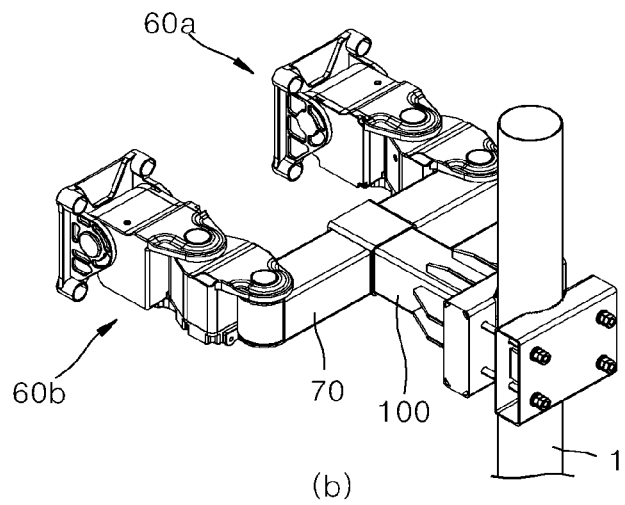
Figure 2:
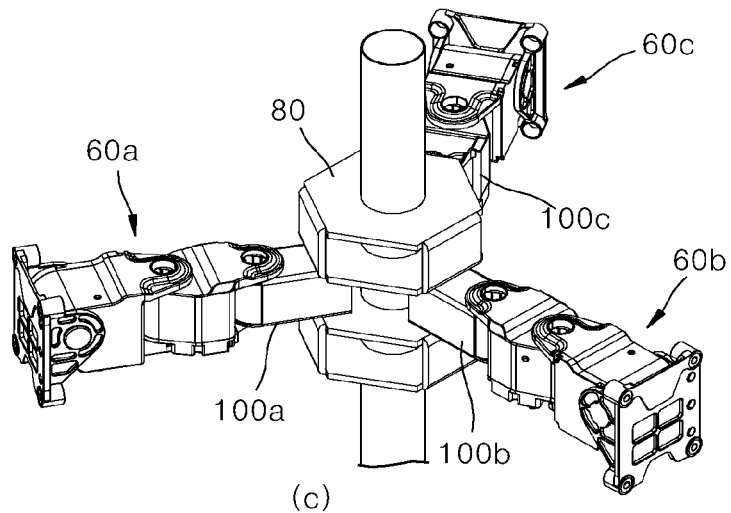
Figure 3A:
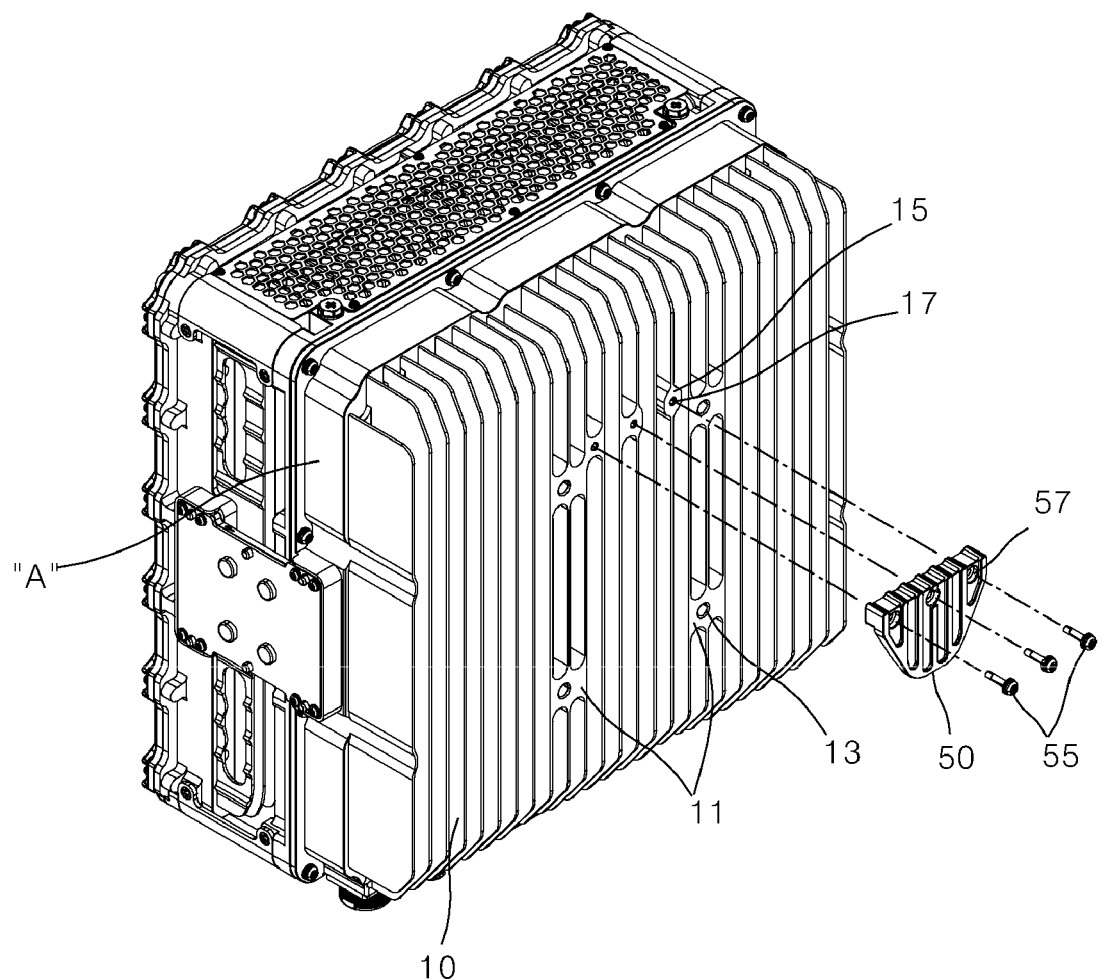
FIGS. 3A and 3B are exploded perspective views illustrating a state in which an antenna device is installed on a tilting unit of the clamping apparatus for an antenna according to the embodiment of the present disclosure.
Figure 3B:
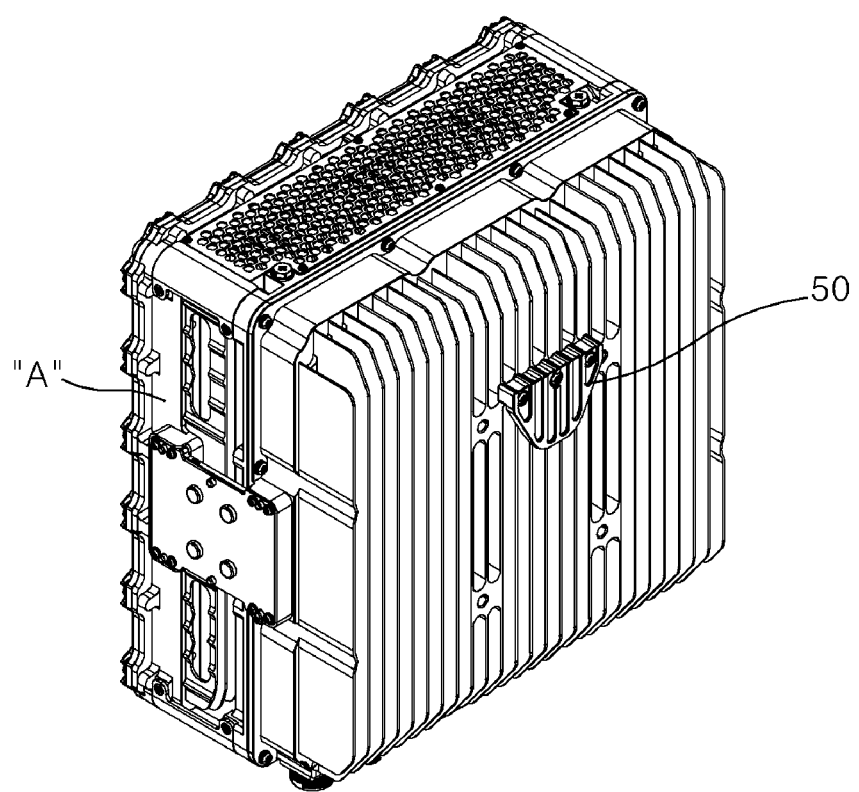
Figure 4A:
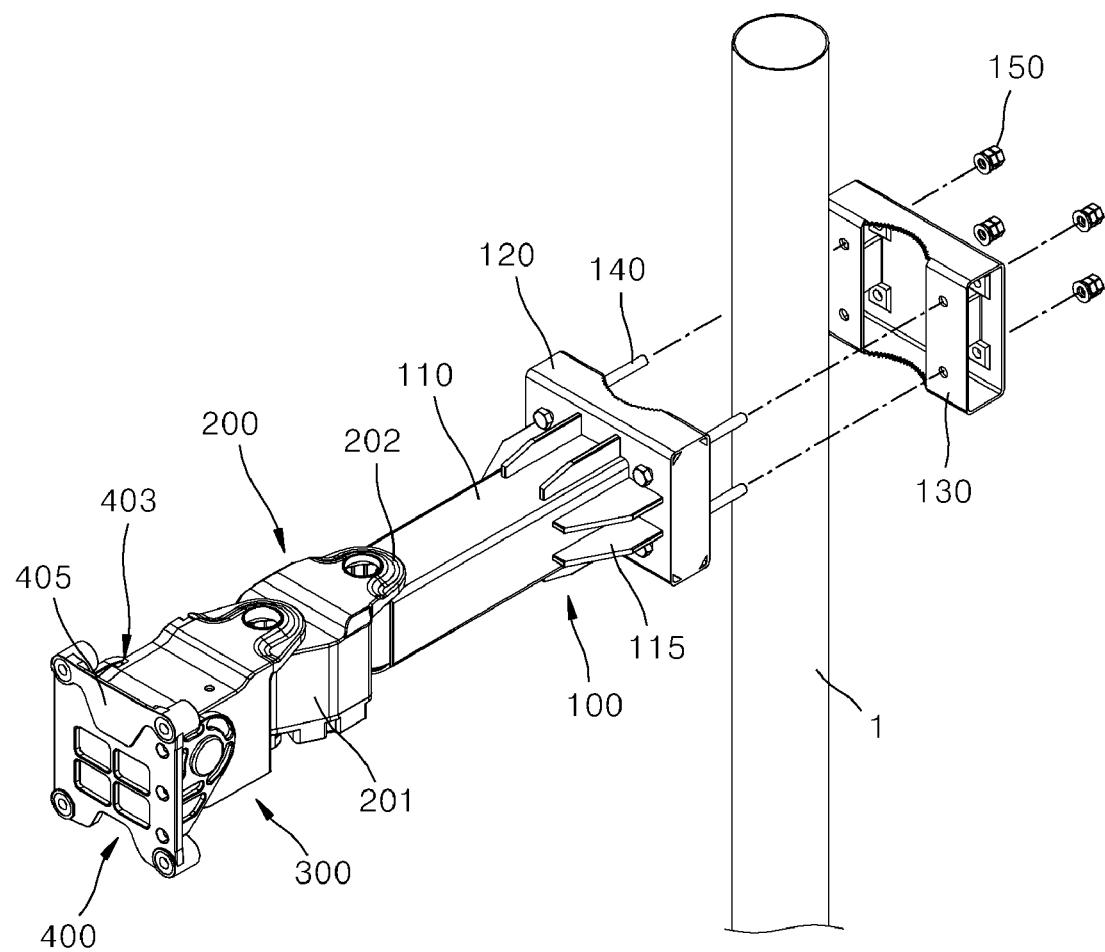
FIGS. 4A to 4C are exploded perspective views illustrating sequential installation on the support pole of the clamping apparatus for an antenna according to the embodiment of the present disclosure.
Figure 4B:
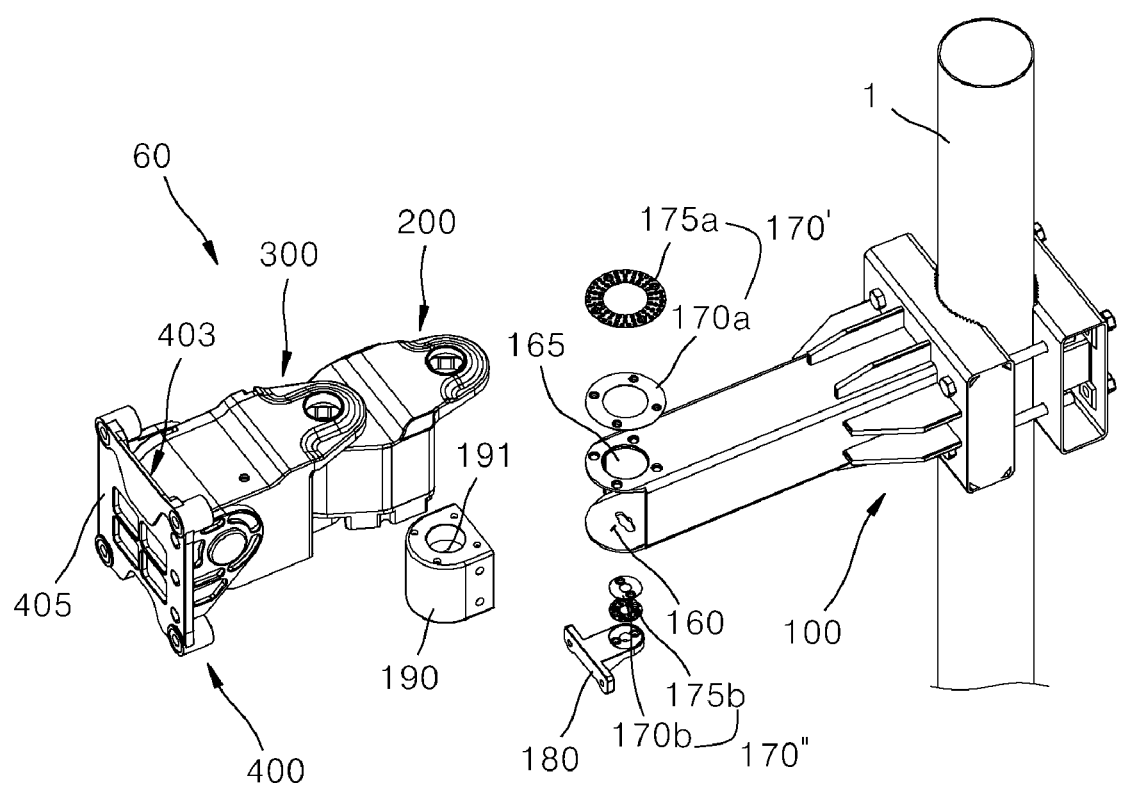
Figure 4C:
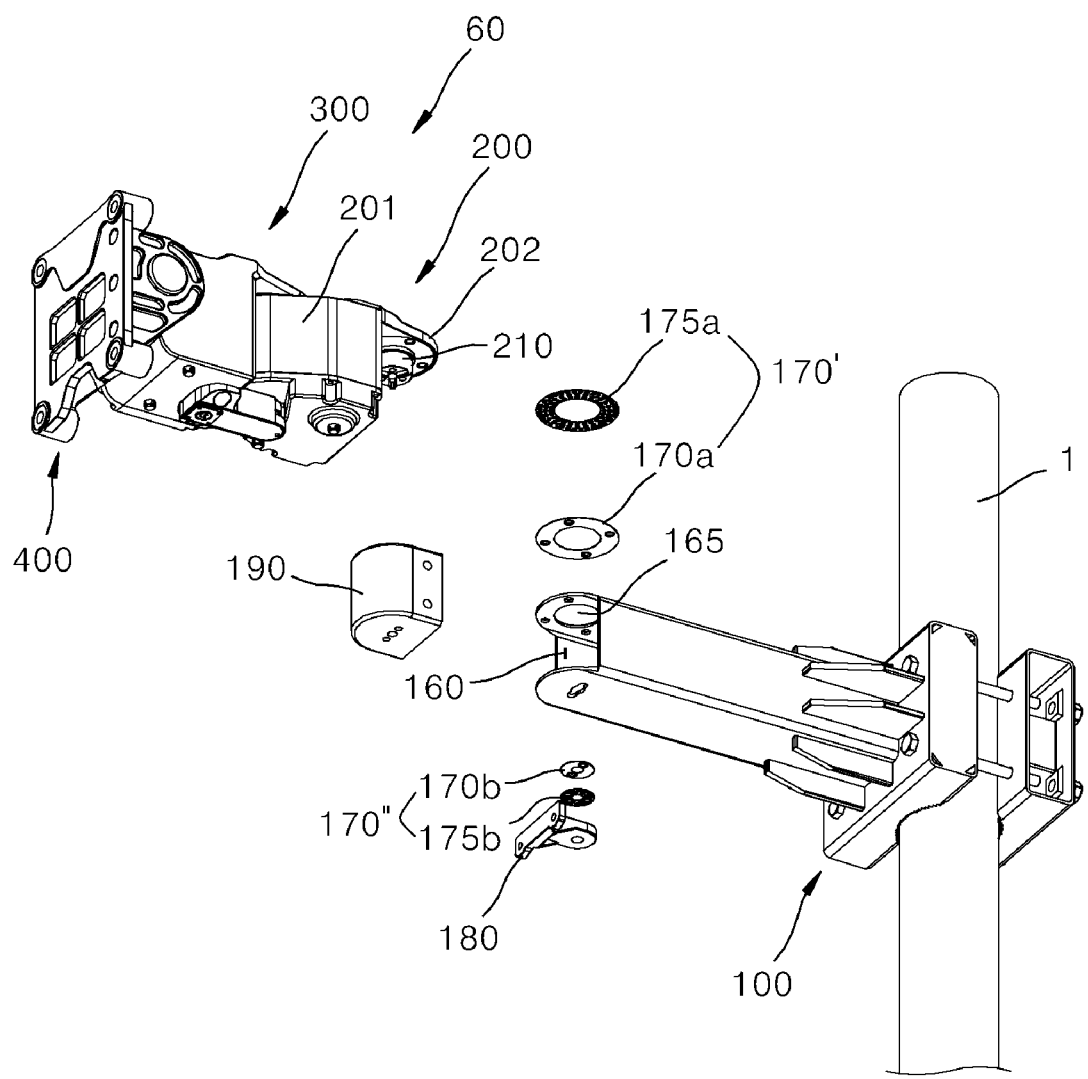
Figure 5A:
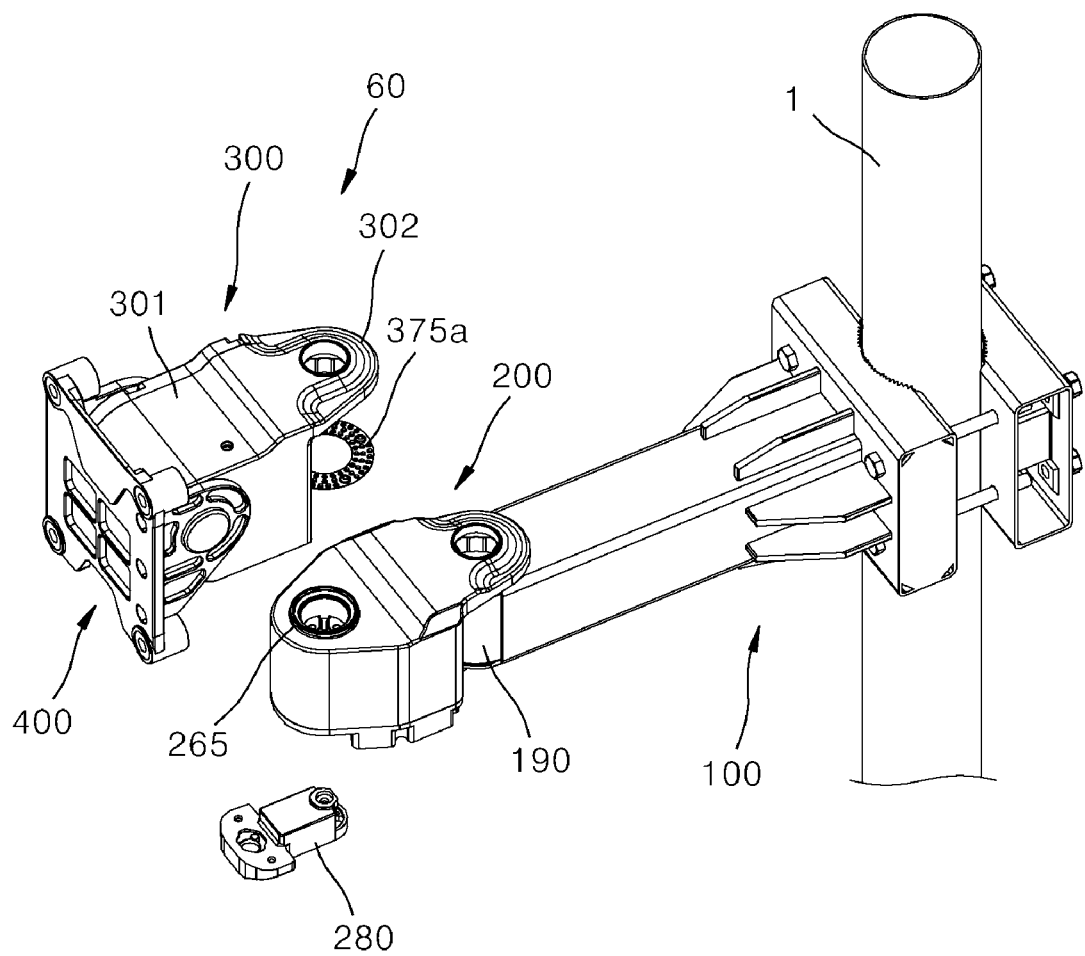
FIGS. 5A and 5B are exploded perspective views illustrating a state in which a rotation unit is coupled to a coupling unit in the clamping apparatus for an antenna according to the embodiment of the present disclosure.
Figure 5B:
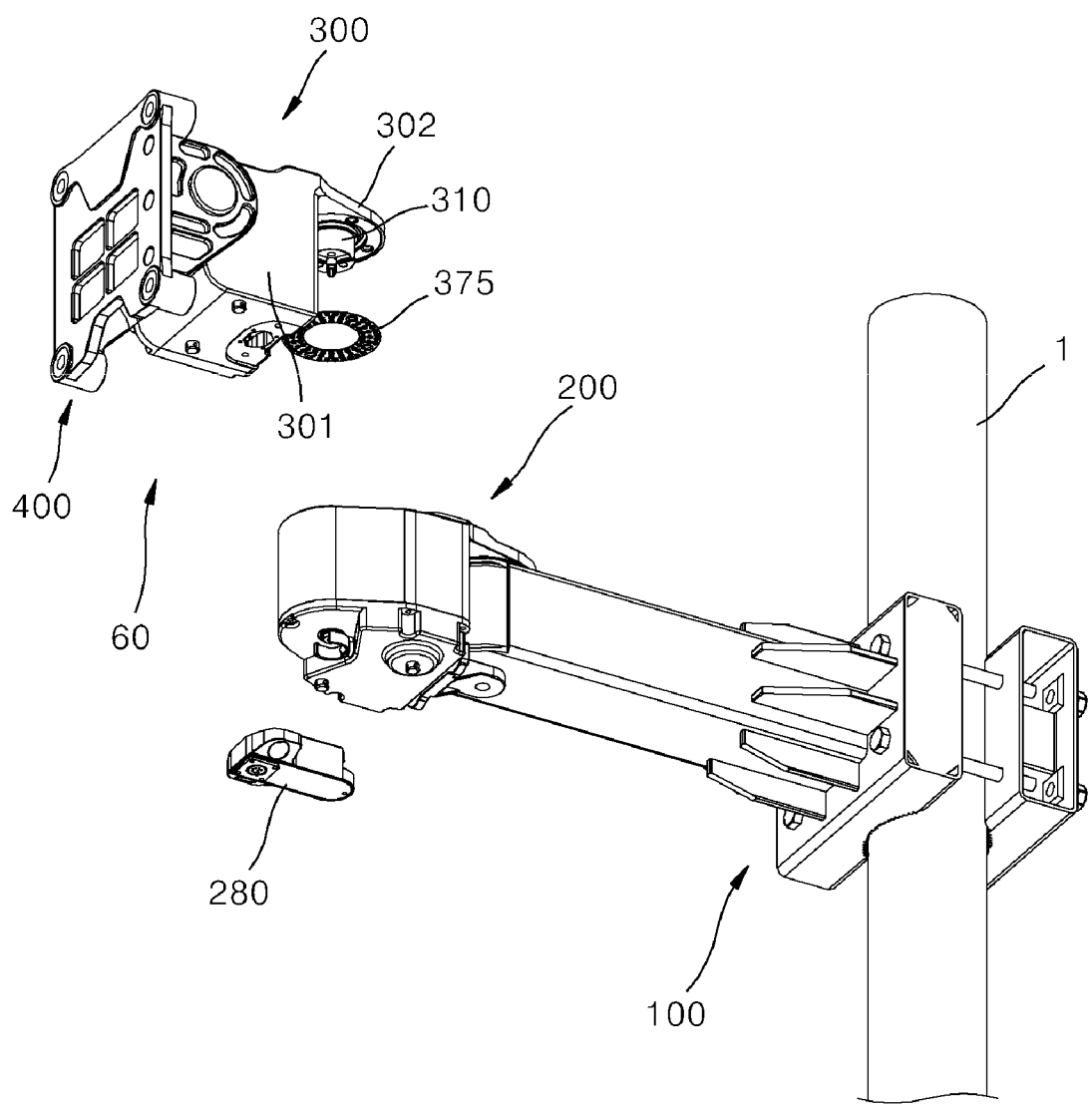
Figure 6A:
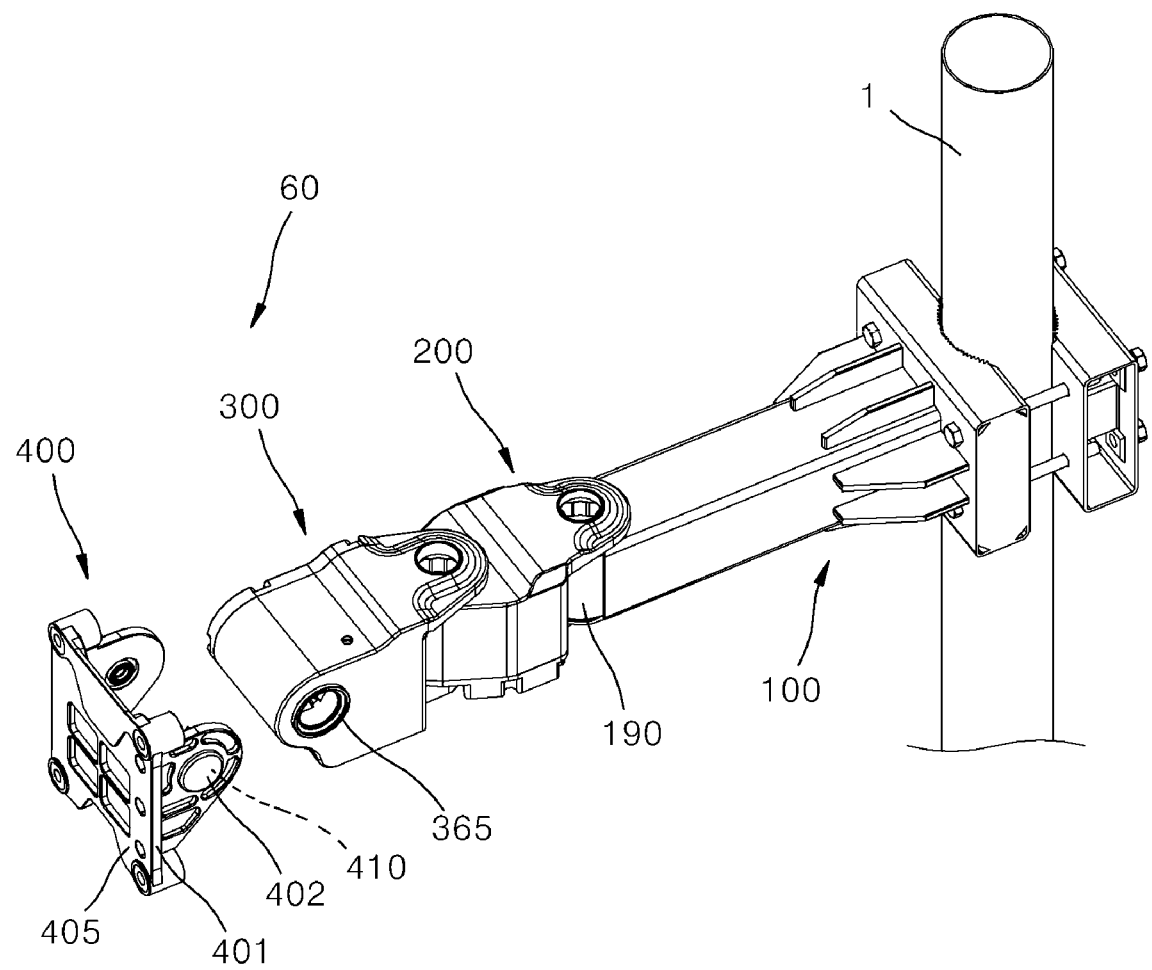
FIGS. 6A and 6B are perspective views illustrating a state in which the tilting unit is coupled to the rotation unit in the clamping apparatus for an antenna according to the embodiment of the present disclosure.
Figure 6B:
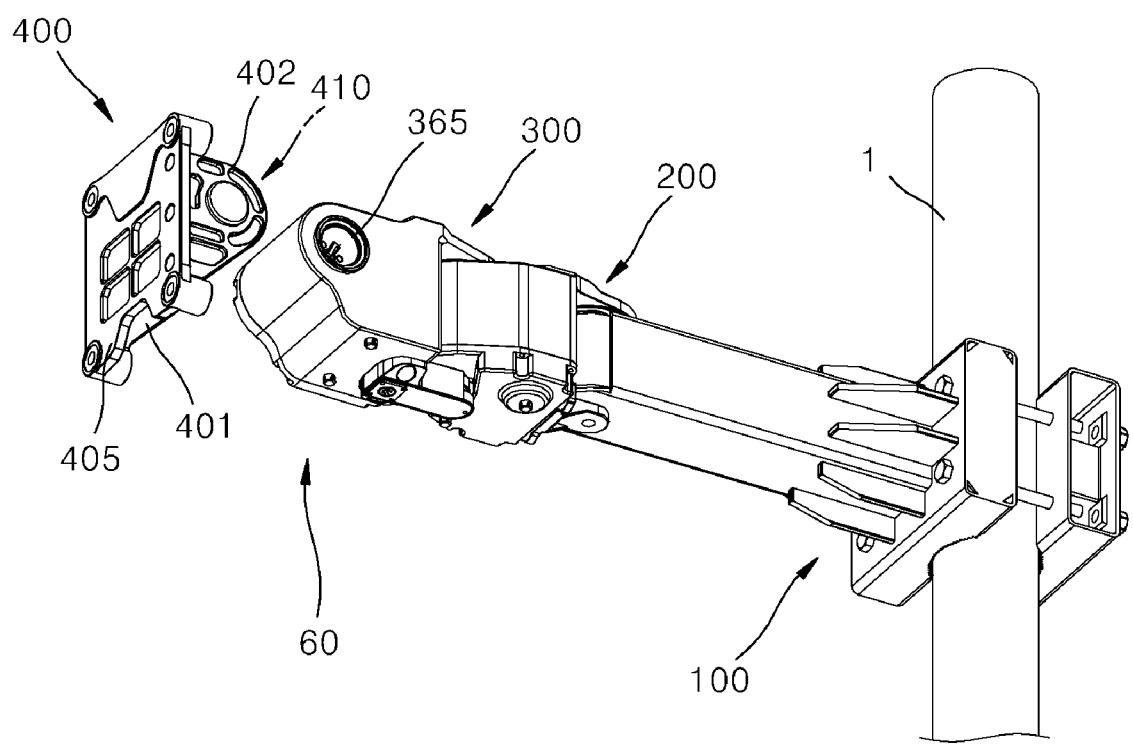

FIG. 1 is a perspective view illustrating a clamping apparatus for an antenna according to an embodiment of the present disclosure. FIG. 2 is a perspective view illustrating various examples of installation of a support pole of the clamping apparatus for an antenna according to the embodiment of the present disclosure. FIGS. 3A and 3B are exploded perspective views illustrating a state in which an antenna device is installed on a tilting unit of the clamping apparatus for an antenna according to the embodiment of the present disclosure. FIGS. 4A to 4C are exploded perspective views illustrating sequential installation on the support pole of the clamping apparatus for an antenna according to the embodiment of the present disclosure. FIGS. 5A and 5B are exploded perspective views illustrating a state in which a rotation unit is coupled to a coupling unit in the clamping apparatus for an antenna according to the embodiment of the present disclosure. FIGS. 6A and 6B are perspective views illustrating a state in which the tilting unit is coupled to the rotation unit in the clamping apparatus for an antenna according to the embodiment of the present disclosure.

As illustrated in FIG. 1, the clamping apparatus for an antenna according to the embodiment of the present disclosure includes an arm unit 100 coupled to a support pole 1, a common coupling unit 200 coupled to the arm unit 100, a rotation unit 300 coupled to the common coupling unit 200 to be rotatable from side to side, and a tilting unit 400 coupled to the rotation unit 300 to be tiltable vertically, wherein an antenna device A is coupled to the tilting unit 400.

The arm unit 100 serves to allow the antenna device A to be coupled to the support pole 1.

The arm unit 100 may be provided in the form of a single beam extending in a horizontal direction orthogonal to one (single) support pole 1, as illustrated in FIG. 2 (2(a) and 2(b)). A single clamping section 60 including the tilting unit 400 and the rotation unit 300 is preferably installed in one arm unit 100.

However, the present disclosure is not limited thereto. That is, it is not necessary to install only a single clamping section 60 on one arm unit 100. In other words, as illustrated in FIG. 2(b), the arm unit 100 may be branched through a branch frame 70 so that clamping sections 60a and 60b each including the tilting unit 400 and the rotation unit 300 are connected to the respective ends of the arm unit 100. In this case, the arm unit 100 and the branch frame 70 may form an approximately "T" shape.

Alternatively, as illustrated in FIG. 2(c), in the clamping apparatus for an antenna according to the embodiment of the present disclosure, two or three or more arm units 100a, 100b, and 100c may be installed radially on the single support pole 1, and clamping sections 60a, 60b, and 60c may be mounted at the ends of the respective arm units 100a, 100b, and 100c. To this end, the clamping apparatus may further include a central bracket 80 for installation of the arm units 100a, 100b, and 100c therethrough, and the central bracket 80 may be provided at the center of the single support pole 1. Here, the individual arm units 100a, 100b, and 100c may be installed with different heights on the single support pole 1. On the other hand, the arm units 100a, 100b, and 100c may be installed at the same height as illustrated in FIG. 2(c).

In the clamping apparatus for an antenna according to the embodiment of the present disclosure having the configuration described above, as illustrated in FIGS. 3A and 3B, the antenna device A may be mounted to the tilting unit 400 of the clamping section 60 provided at the front end of the arm unit 100 in a manner that the antenna device A is inserted from top to bottom and latched to the tilting unit 400. This is typically to improve the installation workability of the antenna device A having a relatively large weight on the site. The installation of the antenna device A to the tilting unit 400 will be described in detail together with each component of the clamping section 60 to be described later.

As illustrated in FIG. 4A, the arm unit 100 may include an arm body 110 extending in one horizontal direction from the support pole 1 by a predetermined length, a fixed bracket 120 provided integrally at the other end, which corresponds to the support pole 1, of the arm body 110 and closely coupled to one side on the outer peripheral surface of the support pole 1, and a detachable bracket 130 coupled to the fixed bracket 120 by a plurality of long fixing bolts 140 and closely coupled to the other side on the outer peripheral surface of the support pole 1. The long fixing bolts 140 may have ends coupled to a plurality of fixing nuts 150 provided at the detachable bracket 130.

The arm body 110 may have a plurality of reinforcing ribs 115 formed integrally on the other end thereof to reinforce the coupling portion with the fixed bracket 120. The arm body 110 and the fixed bracket 120 may be made of a metal material, and may be integrally formed by injection molding. However, the present disclosure is not necessarily limited thereto. For example, the arm body 110 and the fixed bracket 120 may be separately manufactured and then coupled to each other by welding or the like.

The arm body 110 and the fixed bracket 120 may be made of a metal material, and may be molded integrally with each other. The detachable bracket 130 may also be made of a metal material, and may be molded differently from the arm body 110 and the fixed bracket 120.

The arm unit 100 may be configured such that the fixed bracket 120 and the detachable bracket 130 are bolted to each other, as described above, and may be in the form of a single beam that extends in a horizontal direction orthogonal to the longitudinal direction of the support pole 1 by a predetermined length so that the antenna device A is spaced apart from the support pole 1 by a predetermined length.

The common coupling unit 200 may be first coupled to the front end of the arm body 110 of the arm unit 100 for coupling of the clamping section 60, manufactured in different specifications, through the common coupling unit 200, which will be described later. However, in some embodiments, the rotation unit 300 may also be directly installed at the front end of the arm body 110 without the help of the common coupling unit 200 (which will be described in detail with reference to FIGS. 8 and 9).

Hereinafter, a description will be given on the premise that the rotation unit 300 is installed at the front end of the arm body 110 of the arm unit 100 through the common coupling unit 200. The common coupling unit 200 is basically provided in a form similar to the rotation unit 300, but may have a structure in which it is fixed to the front end of the arm body 110 or optionally rotatable like the rotation unit 300 when the antenna device A is additionally required to rotate from side to side.

As illustrated in FIGS. 4A to 4C, the common coupling unit 200 may include a first common coupling part 201 provided at one end thereof and coupled to the rotation unit 300, a second common coupling part 202 provided at the other end thereof and extending from the upper end of the first common coupling part 201 by a predetermined length, and a coupling shaft 210 extending downward from the second common coupling part 202 by a predetermined length. Here, the coupling shaft 210 may be provided in the form of a boss inserted into and supported by a shaft insertion hole 191 of a fixing shaft hole block 190 to be described later, may be provided in the form of a long bolt inserted and bolted through the shaft insertion hole 191 of the fixing shaft hole block 190, or may be provided in a mixed form thereof.

The first common coupling part 201 of the common coupling unit 200 may be equipped with a rotation angle adjustment part 230 to be described later. This will be described in more detail later.

The fixing shaft hole block 190 may be provided at the front end of the arm body 110 of the arm unit 100 for coupling of the common coupling unit 200. Here, the fixed shaft hole block 190 may function to allow for coupling of the common coupling unit 200. In another embodiment, the fixed shaft hole block 190 may allow for direct coupling of the rotation unit 300. The embodiment that allows for direct coupling of the rotation unit 300 will be described later in more detail.

In more detail, the arm body 110 is in the form of a hollow square tube, the front end of the arm body 110 is open at one side thereof (i.e., in which the antenna device A is positioned), and the arm body 110 has semicircular protruding upper and lower ends.

The fixing shaft hole block 190 may be fixedly inserted into an internal space 160 of the open front end of the arm body 110. Since the fixing shaft hole block 190 corresponds to the internal space 160 of the front end of the arm body 110, the fixing shaft hole block 190 may be in the form of a circular column having an approximately semicircular horizontal cross-section at one end thereof, and in the form of a square block at the other end thereof.

The fixing shaft hole block 190 may be provided with the shaft insertion hole 191 in which the coupling shaft 210 of the common coupling unit 200 is axially installed from top to bottom. In addition, the front end of the arm body 110 may have a shaft through-hole 165 formed at the upper side thereof so that the coupling shaft 210 of the common coupling unit 200 is inserted into the shaft insertion hole 191, formed in the fixing shaft hole block 190, through the shaft through-hole 165.

The coupling shaft 210 may be coupled to the shaft insertion hole 191 by one of interference fitting, screwing, and bolting.

Meanwhile, the front end of the arm body 110 of the arm unit 100 may be provided with a brake part 170'/170" configured to form a predetermined frictional force between the front end of the arm body 110 and the common coupling unit 200.

The brake part 170'/170" may include an upper brake washer pad 170' (170a/175a) provided on the upper side of the front end of the arm body 110 of the arm unit 100 to form a frictional force with the upper bonding surface of the common coupling unit 200, and a lower brake washer pad 170" (170b/175b) provided on the lower side of the front end of the arm body 110 of the arm unit 100 to form a frictional force with the lower bonding surface of the common coupling unit 200.

As illustrated in FIGS. 4B and 4C, the respective upper and lower brake washer pads 170' (170a/175a) and 170" (170b/175b) may include fixing plates 170a and 170b fixed to the respective upper and lower sides of the front end of the arm body 110 of the arm unit 100 to provide a friction surface, and rotating plates 175a and 175b provided to the respective upper and lower sides of the common coupling unit 200 to form a frictional force with the fixing plates 170a and 170b while rotating.

Here, as illustrated in FIGS. 4B and 4C, the fixing plate 170a of the upper brake washer pad 170' (170a/175a) may be fixed to the upper side of the front end of the arm body 110 of the arm unit 100, and the rotating plate 175a of the upper brake washer pad 170' (170a/175a) may be provided on the circumferential surface of the coupling shaft 210 corresponding to the lower surface of the second common coupling part 202 at the rear end of the common coupling unit 200 so as to rotate together with the common coupling unit 200, thereby forming a predetermined frictional force when there is a need for additional rotation as described above.

As illustrated in FIGS. 4B and 4C, the lower brake washer pad 170" (170b/175b) may be installed through a washer installation bracket 180, which is connected to the lower surface of the rear end of the rotation unit 300 and extends from the lower end of the first common coupling part 201 of the common coupling unit 200 to the lower surface of the front end of the arm body 110.

Here, the rotating plate 175*b* is provided on the upper surface of the washer installation bracket 180, and the fixing plate 170*b* is fixed to the lower side of the front end of the arm body 110 of the arm unit 100, in order for the common coupling unit 200 to form a predetermined frictional force when there is a need for additional rotation as described above.

The common coupling unit 200 has been described until now as being fixed to the front end of the arm body 110 of the arm unit 100 in order to promote assembly commonality even when the clamping section 60 is provided in different shapes with various specifications.

However, the rotation unit 300 may be installed directly and rotatably at the front end of the arm body 110 through the fixing shaft hole block 190 without using the common coupling unit 200. In this case, since the common coupling unit 200 is not required, it is preferable to design the clamping apparatus without the rotation angle adjustment part 230 built in the first common coupling part 201 of the common coupling unit 200. Alternatively, the rotation angle adjustment part 230 may also be provided directly inside the fixing shaft hole block 190, rather than removal thereof.

In addition to the above-mentioned configuration, individual components of the rotation unit 300 may be coupled to the front end of the arm body 110 of the arm unit 100 in the same manner as in the fixing shaft hole block 190 of the common coupling unit 200.

As illustrated in FIGS. 4B and 4C, the clamping section 60 may be rotatable or tiltable to help the installation of the antenna device A and simultaneously set the directionality of the antenna device A.

More specifically, the clamping section 60 may include the rotation unit 300 coupled to the front end of the arm body 110 of the arm unit 100, and the tilting unit 400 coupled to the rotation unit 300.

As illustrated in FIGS. 1 and 2, the antenna device A may be detachably installed on the tilting unit 400.

As illustrated in FIGS. 1 to 3B, the tilting unit 400 may have a bracket panel 405 attached on the front surface thereof, and a hook fastening bracket 50 may be spaced rearward from the rear surface of the antenna device A coupled to the tilting unit 400.

Here, the hook fastening bracket 50 may have a plurality of hook-side screw holes 57 formed at the upper end thereof so that hook fixing screws 55 to be described later pass through the hook-side screw holes 57, and may have an approximately inverted triangular shape.

As illustrated in FIG. 4*a*, a fastening groove 403 may be formed between the tilting unit 400 and the bracket panel 405 attached on the front surface of the tilting unit 400, so that the lower end of the inverted triangular hook fastening bracket 50 is inserted from top to bottom and seated in the fastening groove 403. The fastening groove 403 preferably has a shape corresponding to the inverted triangular hook fastening bracket 50 such that the lower end of the hook fastening bracket 50 is inserted and seated in the fastening groove 403.

As illustrated in FIG. 1, a plurality of tilting-side screw holes 407 may be formed at the upper end of the bracket panel 405 so that the hook fixing screws 55 are fastened to the antenna device A through the tilting-side screw holes 407 of the tilting unit 400.

An installer for installing the antenna device A may simply insert the hook fastening bracket 50 from top to bottom into the installation groove formed in the tilting unit 400 to seat and then firmly assemble the same therein using the hook fixing screws 55, in a state in which the hook fastening bracket 50 is temporarily fixed to the rear surface of the antenna device A. Accordingly, it is possible to improve assembly workability without requiring a large number of installers.

As illustrated in FIGS. 5A and 5B, the rotation unit 300 may include a first rotation coupling part 301 provided at one end thereof and coupled to the tilting unit 400, a second rotation coupling part 302 provided at the other end thereof and extending from the upper end of the first rotation coupling part 301 by a predetermined length, and a rotary shaft 310 extending downward from the second rotation coupling part 302 by a predetermined length.

The rotary shaft 310 may be coupled to a shaft hole 231' (see FIG. 7) of a rotating shaft 231 provided in the first common coupling part 201 of the common coupling unit 200 in a manner similar to the coupling of the coupling shaft 210 to the shaft insertion hole 191 of the fixing shaft hole block 190 as described above.

Here, the rotary shaft 310 may be provided in the form of a boss inserted into and supported by the shaft hole 231' of the rotating shaft 231, may be provided in the form of a long bolt inserted and bolted through the shaft hole 231' of the rotating shaft 231, or may be provided in a mixed form thereof.

The first rotation coupling part 301 may be equipped with a tilt angle adjustment part 330 to be described later. This will be described in more detail later.

Referring to FIGS. 6A and 6B, the tilting unit 400 may include a first tilting coupling part 401 provided at one end thereof so that the antenna device A is detachably coupled to the first tilting coupling part 401, and second tilting coupling parts 402 provided at the other end thereof while extending from both left and right ends of the first tilting coupling part 401 and tiltably coupled to both left and right side walls of the first rotation coupling part 301 of the rotation unit 300.

A tilt shaft 410 may be provided at one of the second tilting coupling parts 402 formed on both left and right sides of the tilting unit 400 and may be inserted into a tilting coupling hole 365 formed in the first rotation coupling part 301.

The tilt shaft 410 may be coupled to a shaft hole 331' (see FIG. 7) of a tilting shaft 331 provided in the first rotation coupling part 301 in a manner similar to the coupling of the coupling shaft 210 to the shaft insertion hole 191 of the fixing shaft hole block 190 as described above.

Here, the tilt shaft 410 may be provided in the form of a boss inserted into and supported by the shaft hole 331' of the tilting shaft 331, may be provided in the form of a long bolt inserted and bolted through the shaft hole 331' of the tilting shaft 331, or may be provided in a mixed form thereof.

The rotary shaft 310 formed at the rotation unit 300 serves as a center of rotation about which the rotation unit is rotated from side to side with respect to the common coupling unit 200 or the arm body 110 of the arm unit 100. In addition, the tilt shaft 410 formed at the tilting unit 400 serves as a center of tilt about which the tilting unit 400 is tilted vertically with respect to the rotation unit 300.

As such, the clamping section 60 according to the present disclosure may be coupled to the common coupling unit 200 so that the rotation unit 300 is rotatable from side to side about the rotary shaft 310 and the antenna device A is thus rotatable from side to side and so that the tilting unit 400 is tiltable vertically about the tilt shaft 410 and the antenna device A is thus tiltable vertically.

Figure 7:
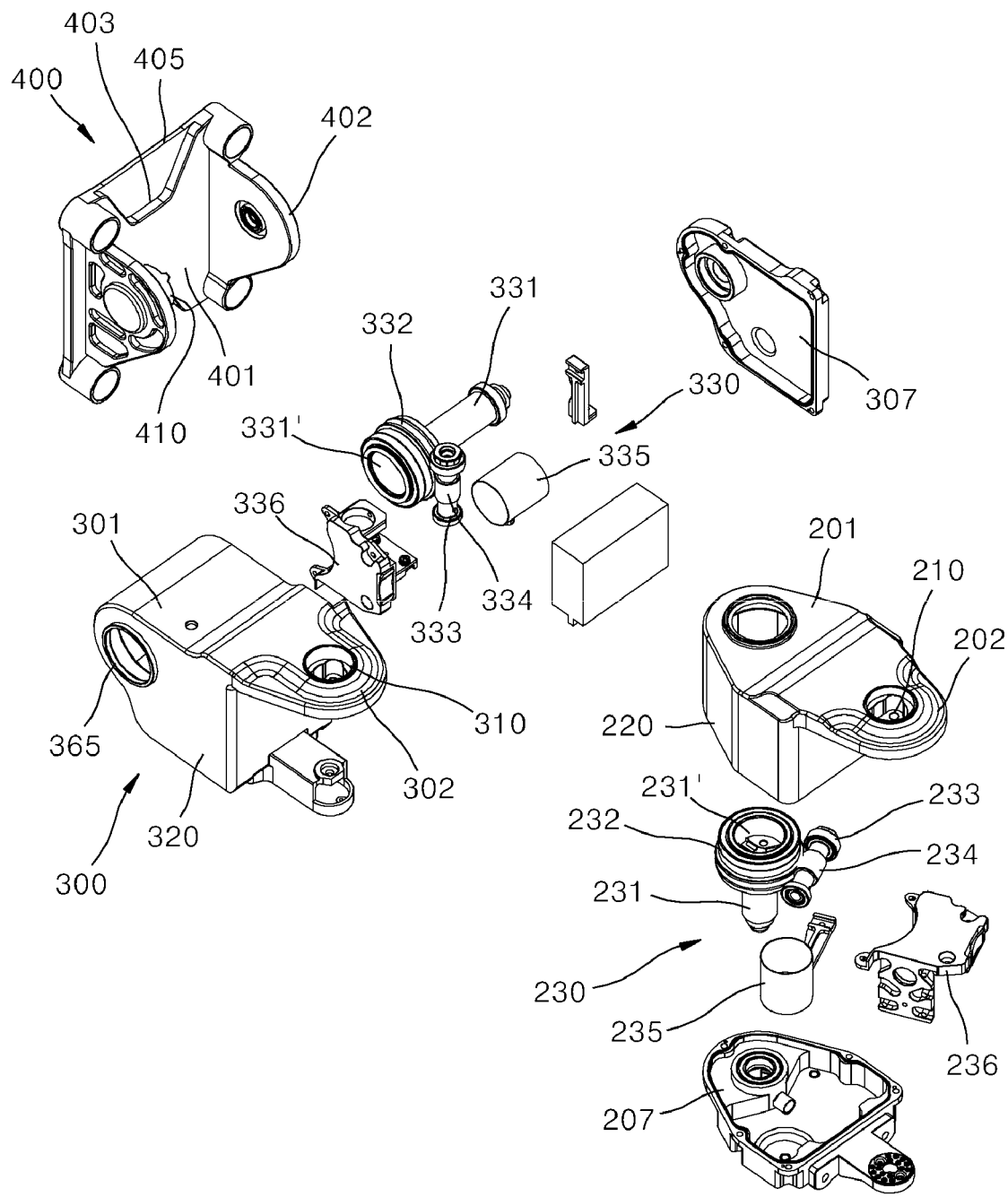
FIG. 7 is an exploded perspective view illustrating a clamping section of the clamping apparatus for an antenna according to the embodiment of the present disclosure.

FIG. 7 is an exploded perspective view illustrating the clamping section of the clamping apparatus for an antenna according to the embodiment of the present disclosure.

In the clamping apparatus for an antenna according to the embodiment of the present disclosure, as illustrated in FIG. 7, the clamping section 60 may further include the rotation angle adjustment part 230 built in the first common coupling part 201 of the common coupling unit 200, and the tilt angle adjustment part 330 built in the first rotation coupling part of the rotation unit 300.

As illustrated in FIG. 6, the rotation angle adjustment part 230 may include a rotating shaft 231 provided vertically in a coupling unit housing 220 configured to form the first common coupling part 201 and define an internal space, a worm wheel gear 232 having worm wheel gear teeth formed on the outer peripheral surface thereof and formed integrally on the outer peripheral surface of the rotating shaft 231, and a worm gear 233 having worm gear teeth 234 engaged with the worm wheel gear teeth of the worm wheel gear 232 and disposed orthogonally to the rotating shaft 231.

The worm gear 233 may be rotated by driving a rotation motor 235 provided to be electrically driven in the coupling unit housing 220. The rotation motor 235 may be securely fixed to the inside of the coupling unit housing 220 through a motor bracket 236.

The shaft hole 231' is formed in the end of the rotating shaft 231, and is exposed to the outside through a rotary shaft through-hole 265 formed vertically in the upper portion of the coupling unit housing 220. The rotary shaft 310 of the rotation unit 300 is coupled to the shaft hole 231' of the rotating shaft 231 exposed through the rotary shaft through-hole 265.

Meanwhile, a coupling unit cover 207 may be provided at the lower side of the coupling unit housing 220 for the convenience of maintenance of each component of the rotation angle adjustment part 230 built in the coupling unit housing 220. The coupling unit cover 207 may support rotation of a lower end opposite to the upper end of the rotating shaft 231 where the shaft hole 231' is formed. The washer installation bracket 180 may be separately provided and then coupled to the coupling unit cover 207 or may be formed integrally therewith.

As illustrated in FIG. 6, the tilt angle adjustment part 330 may include a tilting shaft 331 provided horizontally in a rotating housing 320 configured to form the first rotation coupling part 301 and define an internal space, a worm wheel gear 332 having worm wheel gear teeth formed on the outer peripheral surface thereof and formed integrally on the outer peripheral surface of the tilting shaft 231, and a worm gear 333 having worm gear teeth 334 engaged with the worm wheel gear teeth of the worm wheel gear 332 and disposed orthogonally to the tilting shaft 331.

The worm gear 333 may be rotated by driving a rotation motor 335 provided to be electrically driven in the rotating housing 320. The rotation motor 335 may be securely fixed to the inside of the rotating housing 320 through a motor bracket 336.

The shaft hole 331' is formed in the end of the tilting shaft 331, and is exposed to the outside through a tilt shaft through-hole 365 formed from side to side on one side wall of the rotating housing 320. The tilt shaft 410 of the tilting unit 400 is coupled to the shaft hole 331' of the tilting shaft 331 exposed through the tilt shaft through-hole 365.

Meanwhile, a rotating cover 307 may be provided at one side of the rotating housing 320 for the convenience of maintenance of each component of the tilt angle adjustment part 330 built in the rotating housing 320. The rotating cover 307 may serve to support rotation of the other end opposite to one end of the tilting shaft 231 where the shaft hole 331' is formed.

Figure 8:
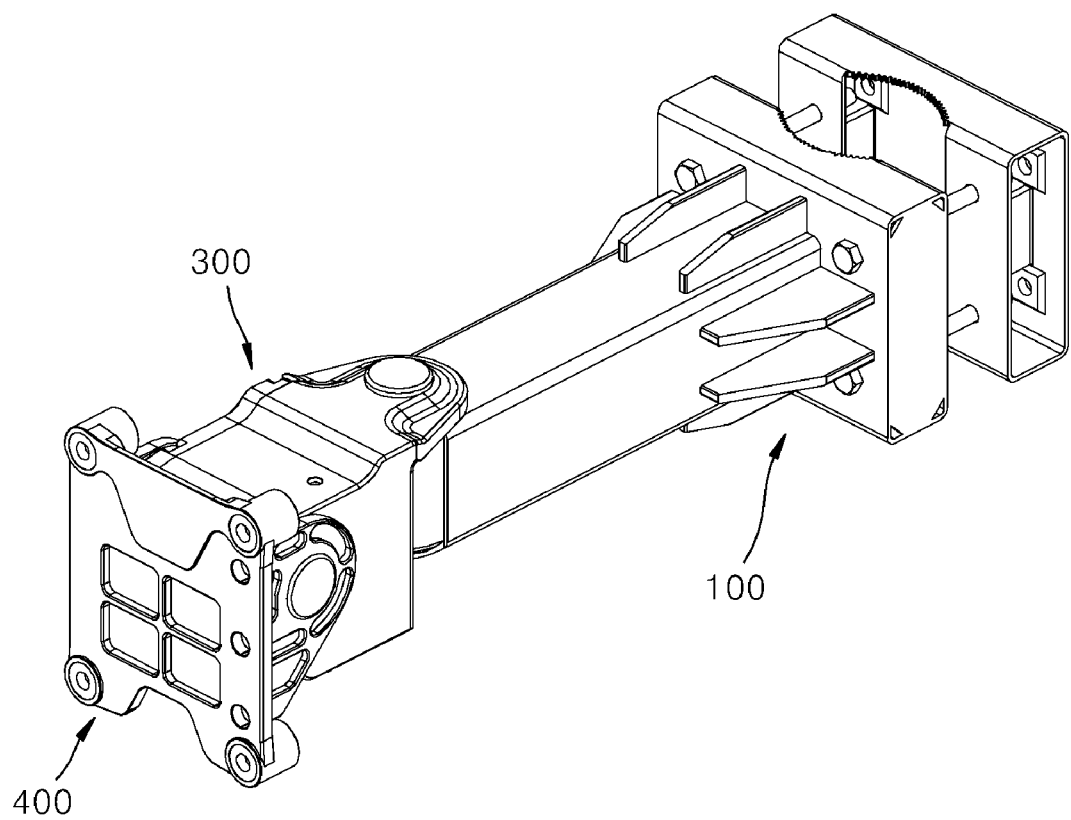
FIG. 8 is a perspective view illustrating a clamping apparatus for an antenna according to another embodiment of the present disclosure.
Figure 9:
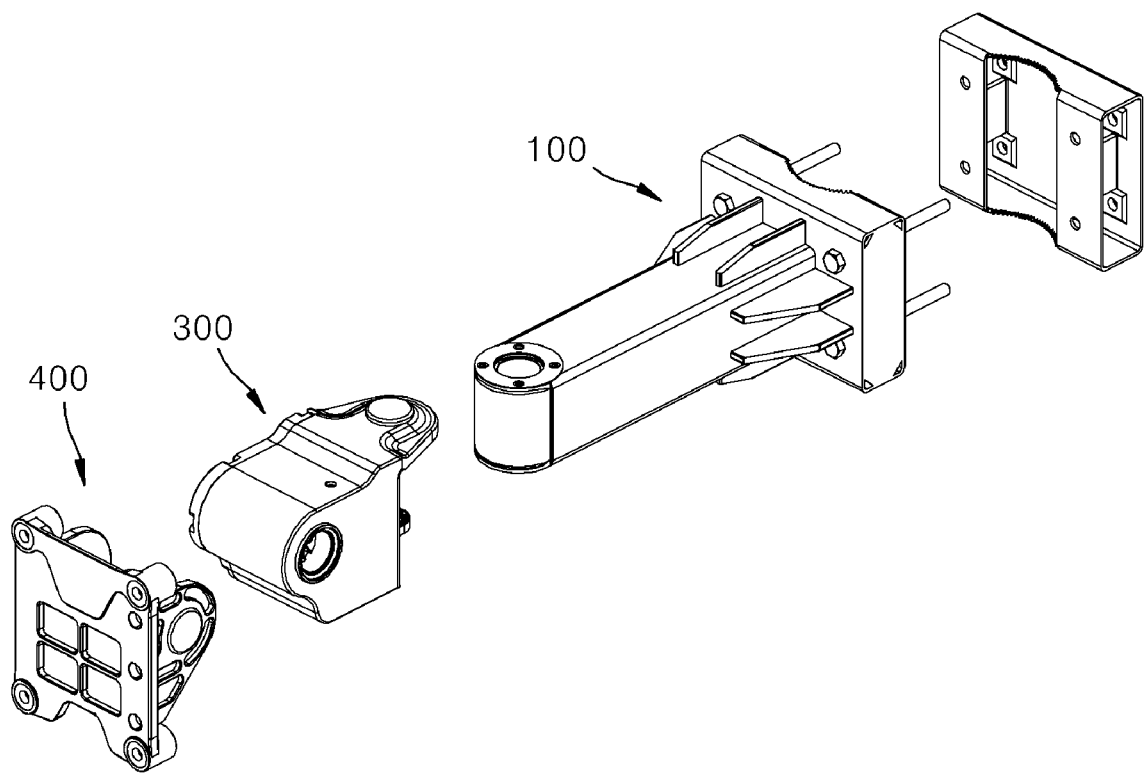
FIG. 9 is an exploded perspective view of FIG. 8.

FIG. 8 is a perspective view illustrating a clamping apparatus for an antenna according to another embodiment of the present disclosure. FIG. 9 is an exploded perspective view of FIG. 8.

The clamping apparatus for an antenna according to the embodiment of the present disclosure is configured such that the rotation unit 300 of the clamping section 60 is installed through the common coupling unit 200, as illustrated in FIGS. 1 to 7.

On the other hand, referring to FIGS. 8 and 9, the clamping apparatus for an antenna according to another embodiment of the present disclosure is configured such that the rotation unit 300 of the clamping section 60 is directly and rotatably provided in the fixing shaft hole block 190 formed at the front end of the arm body 110 of the arm unit 100 without using the common coupling unit 200.

In the clamping apparatus for an antenna according to another embodiment of the present disclosure, since the common coupling unit 200 is not required, it is not necessary to provide the rotation angle adjustment part 230 built in the common coupling unit 200 to rotate the rotation unit 300 from side to side. That is, without the rotation angle adjustment part 230, only the tilt angle adjustment part 330 built in the rotation unit 300 may be required as a common element in the present embodiment.

Since all other components and the combination relationship thereof are identical to those of the above-mentioned embodiment of the present disclosure, a detailed description thereof will be omitted.

Figure 10A:
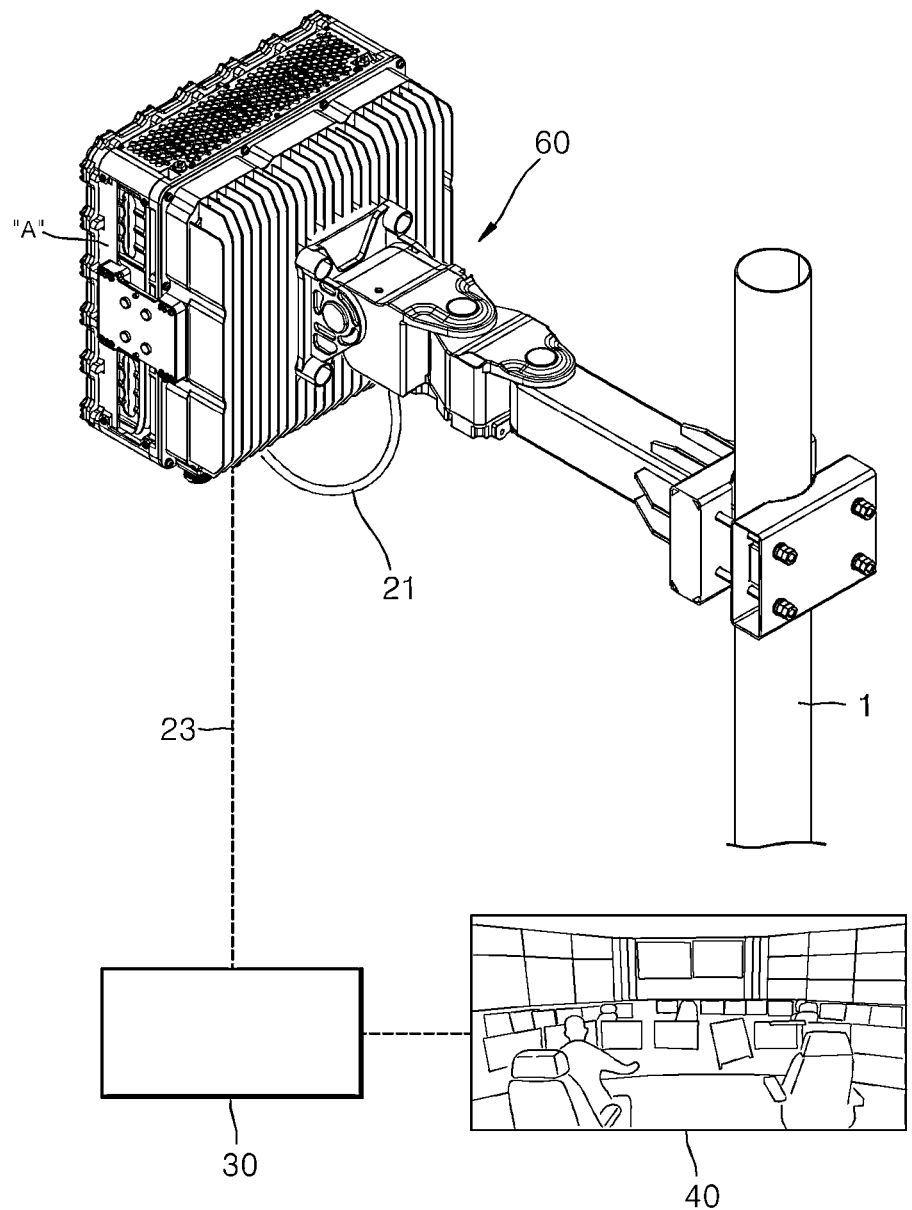
FIGS. 10A and 10B are views schematically illustrating a remote control system for the clamping apparatus for an antenna according to the embodiments of the present disclosure.
Figure 10B:
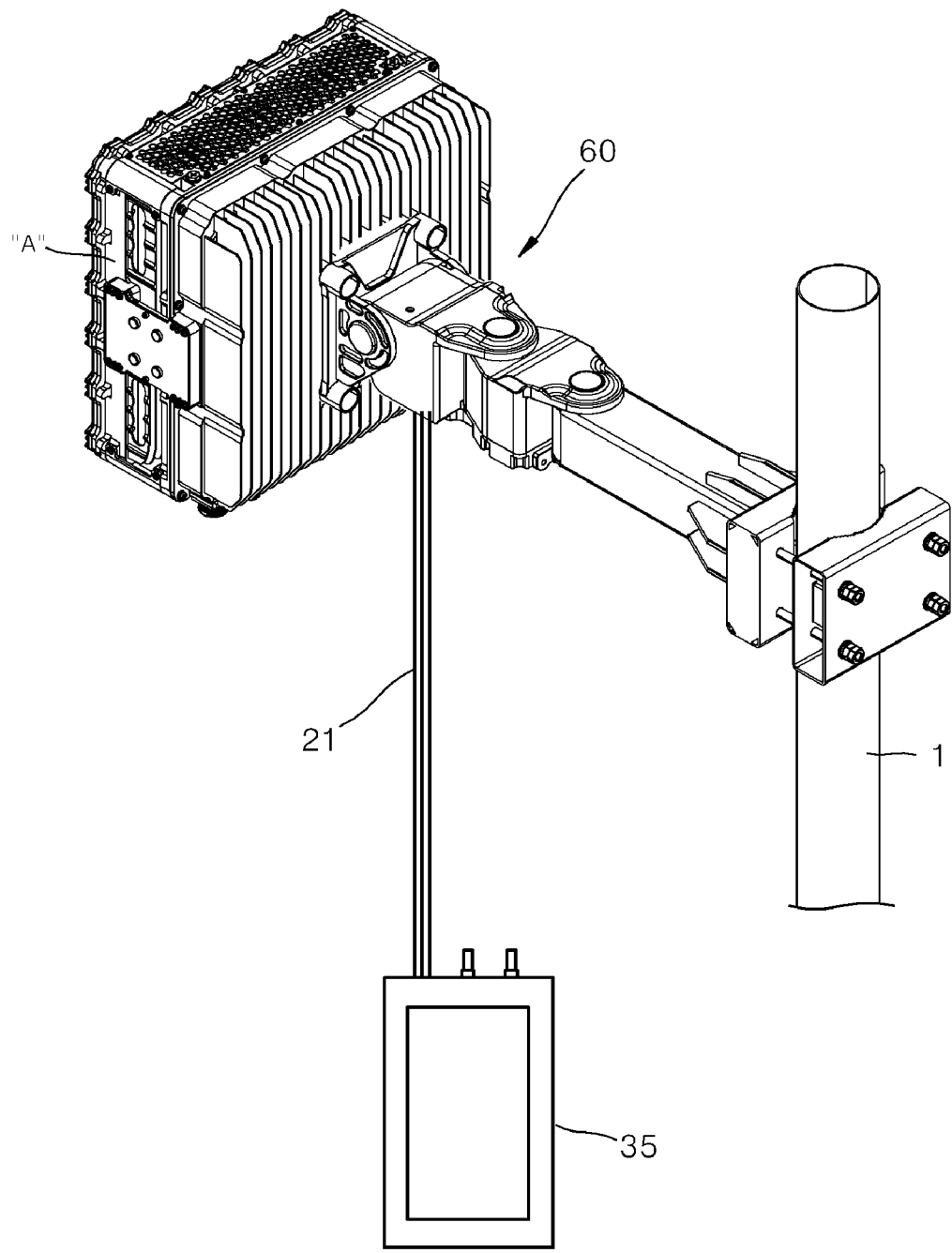

FIGS. 10A and 10B are views schematically illustrating a remote control system for the clamping apparatus for an antenna according to the embodiments of the present disclosure.

In the clamping apparatus for an antenna according to the embodiments of the present disclosure, the on-site installer may directly perform the tilting of the tilting unit 400 and the rotation of the rotation unit 300 to set the directionality of the antenna device A.

On the other hand, as illustrated in FIG. 10A, the tilting of the tilting unit 400 and the rotation of the rotation unit 300 may be remotely controlled by a controller (not shown) provided in the antenna device A connected to enable electrical communication with the tilting unit 400 and the rotation unit 300, and an operator and maintenance (O&M) unit 40 through a distribute unit (DU) 30 allowing for remote connection thereof.

Here, the controller unit of the antenna device A may be connected to the tilting unit 400 and the rotation unit 300 through a communication cable 21, and the controller unit of the antenna device A may be communicatively connected to the distribution unit 30 through an optical cable 23.

As illustrated in FIG. 10B, the tilting of the tilting unit 400 and the rotation of the rotation unit 300 may be remotely controlled by a remote controller 35, which is communicatively connected to the respective adjustment parts of the tilting unit 400 and rotation unit 300 (i.e., the tilt angle adjustment part 330 of the tilting unit 400 and the rotation angle adjustment part 230 of the rotation unit 300) and is detachably connected to the communication cable 21 provided near the clamping section 60 (preferably, at the support pole 1).

Here, the remote controller 35 may be sized to be carried by the on-site installer. After the installation of the antenna device A on the clamping section 60 is completed, the remote controller 35 may be coupled to the terminal of the communication cable 21 so as to match the frequency characteristics of the installation area, thereby remotely controlling the directionality of the antenna device A.

Accordingly, referring to FIGS. 10A and 10B, the on-site installer can directly perform the directional operation of the antenna device A using the remote controller 35, as well as performing remote control by calculating frequency characteristics in the operator and maintenance unit 40. Therefore, it is possible to significantly improve workability.

The clamping apparatus for an antenna according to the exemplary embodiments of the present disclosure has been described in detail with reference to the accompanying drawings in the above. However, the exemplary embodiments of the present disclosure should not be construed as limiting the technical idea of the disclosure. It will be apparent to those skilled in the art that the scope of the present disclosure is limited only by the appended claims and variations and modifications may be made without departing from the spirit and scope of the disclosure. Therefore, these variations and modifications will fall within the scope of the present disclosure as long as they are apparent to those skilled in the art.

INDUSTRIAL APPLICABILITY

The present disclosure provides a clamping apparatus for an antenna, which is capable of increasing a degree of freedom of installation for a support pole having many space constraints and of improving workability.

The invention claimed is:

1. A clamping apparatus for an antenna, comprising:
an arm unit coupled to a support pole and extending in one horizontal direction from the support pole by a predetermined distance;
a common coupling unit detachably mounted to a front end of the arm unit by insertion and detachment operations of a coupling shaft elongated vertically, the common coupling unit being selectively rotatable from side to side about the coupling shaft;
a rotation unit having a front end detachably mounted to a front end of the coupling unit by insertion and detachment operations of a rotary shaft elongated vertically, the rotation unit being rotatable from side to side by a predetermined angle about the rotary shaft; and
a tilting unit coupled to the front end of the rotation unit to be tiltable vertically, an antenna device being coupled to the tilting unit,
wherein the front end of the arm unit is coupled with a fixing shaft hole block to which the coupling shaft of the common coupling unit is axially coupled,
wherein the front end of the arm unit is provided with a brake part configured to form a predetermined frictional force between the front end of the arm unit and the common coupling unit or the rotation unit,
wherein the brake part comprises a lower brake washer pad provided on a lower side of the front end of the arm unit to form a frictional force with a lower bonding surface of the common coupling unit or the rotation unit,
wherein the lower brake washer pad is installed through a washer installation bracket extending from a lower surface of a rear end of the rotation unit.

2. The clamping apparatus according to claim 1, wherein:
the front end of the arm unit is provided with an installation space in which the fixing shaft hole block is inserted and installed; and
the fixing shaft hole block is provided with a shaft insertion hole in which the coupling shaft of the common coupling unit or the rotary shaft of the rotation unit is axially installed from top to bottom.

3. The clamping apparatus according to claim 2, wherein the front end of the arm unit has a shaft through-hole through which the coupling shaft of the common coupling unit is moved from top to bottom and is axially installed in the shaft insertion hole of the fixing shaft hole block.

4. The clamping apparatus according to claim 1, wherein the brake part further comprises:
an upper brake washer pad provided on an upper side of the front end of the arm unit to form a frictional force with an upper bonding surface of the common coupling unit or the rotation unit.

5. The clamping apparatus according to claim 1, wherein the brake part comprises:
a fixing plate fixed to an upper or lower side of the front end of the arm unit to provide a friction surface; and
a rotating plate provided to an upper or lower side of the common coupling unit or the rotation unit to form a frictional force with the fixing plate while rotating.

6. The clamping apparatus according to claim 1, wherein:
the common coupling unit is provided with a rotation angle adjustment part configured to adjust an angle of left and right rotation of the rotation unit; and
the rotation unit is provided with a tilt angle adjustment part configured to adjust an angle of vertical tilt of the tilting unit.

7. The clamping apparatus according to claim 6, wherein the rotation angle adjustment part comprises:
a worm wheel gear axially coupled to the coupling shaft of the common coupling unit for rotation, and having worm wheel gear teeth formed on an outer peripheral surface thereof; and
a worm gear coupled orthogonally to the coupling shaft to rotate the worm wheel gear, and having worm gear teeth formed on an outer peripheral surface thereof and engaged with the worm wheel gear teeth.

8. The clamping apparatus according to claim 7, comprising a rotation motor axially coupled to the worm gear to electrically rotate the worm gear.

9. The clamping apparatus according to claim 6, wherein the tilt angle adjustment part comprises:
a worm wheel gear coupled to a tilt shaft of the tilting unit for rotation, and having worm wheel gear teeth formed on an outer peripheral surface thereof; and
a worm gear coupled orthogonally to the tilt shaft to rotate the worm wheel gear, and having worm gear teeth formed on an outer peripheral surface thereof and engaged with the worm wheel gear teeth.

10. The clamping apparatus according to claim 1, wherein the tilting of the tilting unit and the rotation of the rotation unit are controlled by a remote controller connected to enable electrical communication with the tilting unit and the rotation unit.

11. The clamping apparatus according to claim 1, wherein the tilting of the tilting unit and the rotation of the rotation unit are remotely controlled by an operator and maintenance (O&M) unit through a distribute unit (DU) for a controller of the antenna device connected to enable electrical communication with the tilting unit and the rotation unit.

12. The clamping apparatus according to claim 1, wherein the arm unit is in the form of a single beam connected to one support pole.

13. The clamping apparatus according to claim 12, wherein the arm unit has a branch frame to which the arm unit and another arm unit are connected, wherein another rotation unit is coupled to the another arm unit, and another tilting unit is coupled to the rotation unit.

14. The clamping apparatus according to claim 1, wherein the arm unit consists of two or three or more arm bodies connected radially to one support pole, each of the arm bodies being in a form of a single beam.

15. A clamping apparatus for an antenna, comprising:
an arm unit coupled to a support pole and extending in one horizontal direction from the support pole by a predetermined distance;
a common coupling unit detachably mounted to a front end of the arm unit by insertion and detachment operations of a coupling shaft elongated vertically, the common coupling unit being selectively rotatable from side to side about the coupling shaft;
a rotation unit having a front end detachably mounted to a front end of the coupling unit by insertion and detachment operations of a rotary shaft elongated vertically, the rotation unit being rotatable from side to side by a predetermined angle about the rotary shaft; and
a tilting unit coupled to a front end of the rotation unit to be tiltable vertically, an antenna device being coupled to the tilting unit,
wherein the front end of the arm unit is coupled with a fixing shaft hole block to which the coupling shaft of the common coupling unit is axially coupled,
wherein:
a bracket panel is attached on a front surface of the tilting unit;
a hook fastening bracket is spaced rearward from a rear surface of the antenna device coupled to the tilting unit; and
the antenna device is coupled by inserting the hook fastening bracket into a fastening groove formed between the tilting unit and the bracket panel.

16. The clamping apparatus according to claim 15, wherein the tilting unit and the antenna device are screwed by hook fixing screws fastened to the antenna device through both of the bracket panel and the hook fastening bracket together.

* * * * *